(12) United States Patent
Tomura et al.

(10) Patent No.: US 6,849,212 B2
(45) Date of Patent: Feb. 1, 2005

(54) INJECTION MACHINE AND METHOD OF ADJUSTING VISCOSITY OF MOLTEN RESIN

(75) Inventors: Nobuhide Tomura, Mishima (JP); Motoyasu Ohue, Numazu (JP); Makoto Nishizawa, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 174 days.

(21) Appl. No.: 10/355,205

(22) Filed: Jan. 31, 2003

(65) Prior Publication Data

US 2003/0146531 A1 Aug. 7, 2003

(30) Foreign Application Priority Data

Feb. 1, 2002 (JP) ........................................ 2002-025072

(51) Int. Cl.[7] .............................................. B29C 45/76
(52) U.S. Cl. .............................. 264/40.1; 264/328.17; 264/328.18; 425/145
(58) Field of Search ............................ 264/40.1, 40.3, 264/40.7, 328.17, 328.18; 425/145, 149, 587, 207, 208

(56) References Cited

U.S. PATENT DOCUMENTS

| 4,381,272 A | * | 4/1983 | Ehritt | 264/40.3 |
| 4,550,002 A | * | 10/1985 | Uhland et al. | 264/40.1 |
| 6,451,230 B1 | * | 9/2002 | Eckardt et al. | 264/40.3 |

* cited by examiner

Primary Examiner—Jill L. Heitbrink
(74) Attorney, Agent, or Firm—Pillsbury Winthrop LLP

(57) ABSTRACT

The present invention relates to an injection machine comprising: a heating barrel which heats a powder material, a binder, and a resin material into a molten resin; a screw mounted in the heating barrel to mix the resin material; and a motor which drives the screw in rotation. The injection machine according to the present invention further comprises a through-hole disposed on a side surface of the heating barrel; a pipe in which a solvent for adjusting a viscosity of the resin material is conducted, the pipe being connected to the through-hole; a filter disposed in the through-hole to prevent the resin material from leaking to the pipe; a valve disposed midway on a pipeline of the pipe; a reservoir disposed on an end of the pipeline of the pipe; a load-detecting part which detects a load value of the motor; a controlling part which sets a reference value with respect to a load of the motor; and a driving part which compares the detected load value with the reference value to drive the valve to carry out either one of supply or discharge of the solvent.

16 Claims, 3 Drawing Sheets

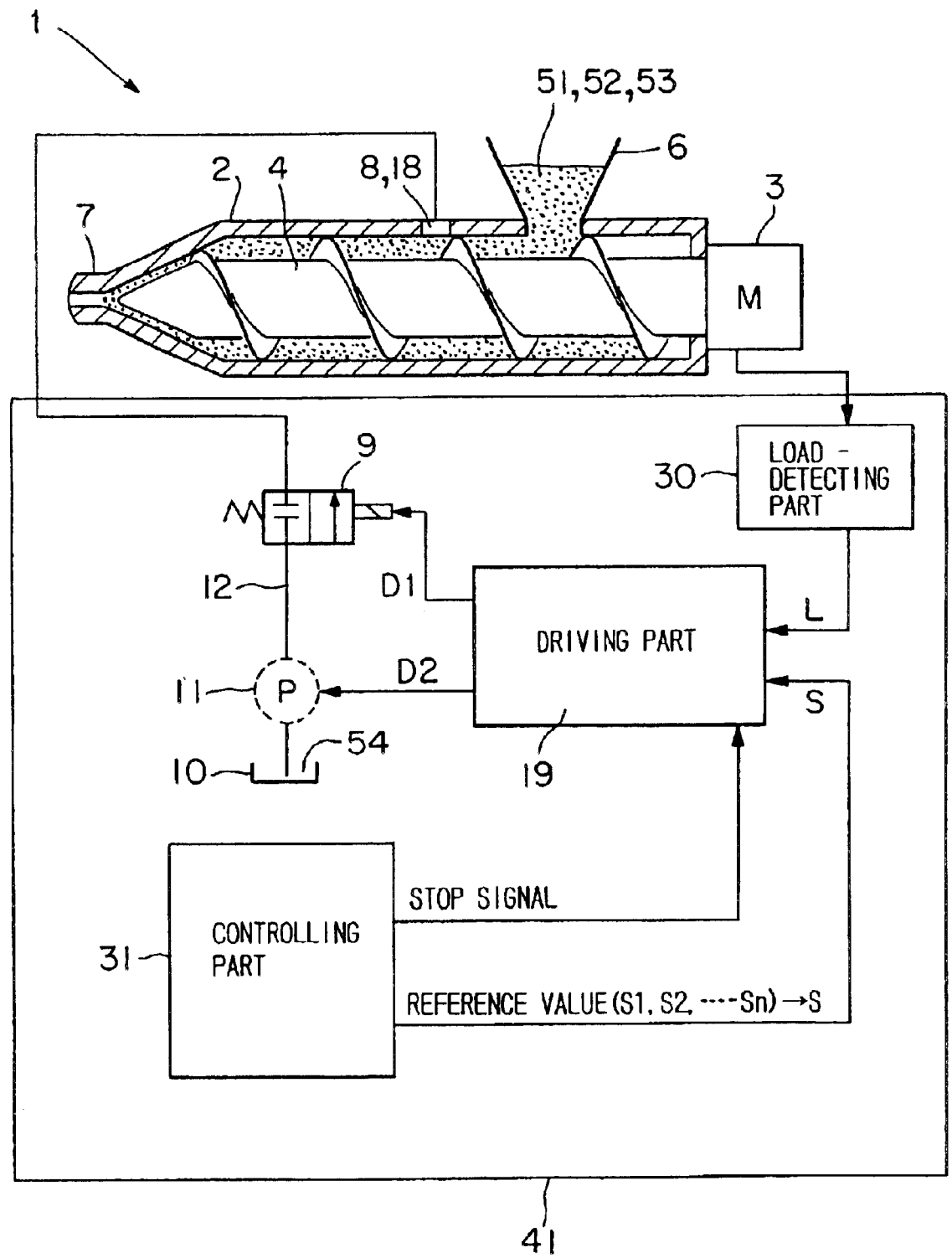
F I G. 1

INJECTION MACHINE AND METHOD OF ADJUSTING VISCOSITY OF MOLTEN RESIN

BACKGROUND OF THE INVENTION

1. Field of the Invention

The present invention relates to an injection machine capable of adjusting a viscosity of molten resin including a powder material and a binder, and a method of adjusting a viscosity of molten resin.

2. Description of Related Art

A powder injection molding method is a method in which a metal or ceramic powder is heated and mixed with a resin binder and a resin material so as to be injected by an injection machine. When executing the powder injection molding, a suitable binder and a suitable resin material should be previously selected and prepared according to the kind of molded goods, such that they may have a proper viscosity when heated and mixed by the injection machine. A viscosity of the binder included in the resin material needs to be maintained under strict control. That is, bothersome operations are necessary in that a binder and a resin material must be changed according to the kind of molded goods, by selecting a combination of a binder and a resin material that has a suitable viscosity.

In a conventional injection machine, the viscosity of a molten resin including a powder material and a binder is not adjusted when the injection machine is in operation. Thus, a resin material and a binder must be previously selected and controlled to maintain a suitable viscosity of the binder.

SUMMARY OF THE INVENTION

An object of the present invention is to provide an injection machine which adjusts a viscosity of a molten resin including a powder material and a binder, and method of adjusting a viscosity of a molten resin.

An injection machine according to the present invention comprises: a heating barrel which heats a powder material, a binder, and a resin material into a molten resin; a screw mounted in the heating barrel to mix the resin material; a motor which drives the screw in rotation; a through-hole disposed on a side surface of the heating barrel; a pipe in which a solvent for adjusting a viscosity of the resin material is conducted, the pipe being connected to the through-hole; a filter disposed in the through-hole to prevent the resin material from leaking to the pipe; a valve disposed midway on a pipeline of the pipe; a reservoir disposed on an end of the pipeline of the pipe; a load-detecting part which detects a load value of the motor; a controlling part which sets a reference value with respect to a load of the motor; and a driving part which compares the detected load value with the reference value to drive the valve to carry out either one of supply or discharge of the solvent.

When mixing the heated molten resin including a powder material and a binder by means of the screw, a load is applied to a motor for driving the screw in rotation depending on the viscosity of the molten resin. The load is detected by the load-detecting part, and compared with a reference value of a load of the motor that has been set by the controlling part. Based on this comparison result, the valve is opened by the driving part to supply or discharge the solvent over a predetermined period or by a predetermined amount. During mixing, the load of the motor is redetected, the supply or the discharge of the solvent is repeatedly carried out until a predetermined value of load is obtained.

Thus, when the injection machine is in operation, the viscosity of a molten resin including a powder material and a binder may be readily adjusted.

Preferably, a pump for sending the solvent is disposed midway on the pipeline of the pipe, the pump functioning by cooperating with the valve driven by the driving part to support either one of supply or discharge of the solvent. The provision of the pump disposed midway on the pipeline improves efficiency of supply and discharge of the solvent by opening and closing the valve, as well as by driving and stopping the pump.

Preferably, the injection machine further comprises: a second through-hole disposed on a side surface of the heating barrel; a second pipe in which a solvent for adjusting a viscosity of the resin material is conducted, the second pipe being connected to the second through-hole; a second filter disposed in the second through-hole, which prevents the resin material from leaking to the second pipe; a second valve disposed midway on a pipeline of the second pipe; and a second reservoir disposed on an end of the pipeline of the second pipe; wherein the driving part compares the detected load value with the reference value to drive the second valve to carry out the other of supply or discharge of the solvent.

More preferably, a second pump for sending the solvent is disposed midway on the pipeline of the second pipe, the second pump functioning by cooperating with the second valve driven by the driving part to support the other of supply or discharge of the solvent.

It is preferable that the controlling part sets a plurality of different reference values according to the kinds of powder material, binder, resin material, and solvent.

Alternatively, it is preferable that the controlling part sets a plurality of different values according to molding conditions.

It is preferable that the driving part drives the valve over a predetermined period to carry out either one of supply or discharge of a predetermined amount of the solvent.

It is preferable that the controlling part generates a stop signal such that either one of supply operation or discharge operation of the solvent is carried out in a more stable manner.

Alternatively, this invention is a method of adjusting a viscosity of molten resin by an injection machine, the injection machine comprising: a heating barrel which heats a powder material, a binder, and a resin material to provide a molten resin; a screw mounted in the heating barrel to mix the resin material; a motor which drives the screw in rotation; a through-hole disposed on a side surface of the heating barrel; a pipe in which a solvent for adjusting a viscosity of the resin material is conducted, the pipe being connected to the through-hole; a filter disposed in the through-hole to prevent the resin material from leaking to the pipe; a valve disposed midway on a pipeline of the pipe; a reservoir disposed on an end of the pipeline of the pipe; a load-detecting part which detects a load value of the motor; a controlling part which sets a reference value with respect to a load of the motor; and a driving part which compares the detected load value with the reference value to drive the valve to carry out either one of supply or discharge of the solvent; the method comprising the steps of: a reference-value-setting step for setting the reference value by the controlling part; a detecting step for detecting a load value of the motor by the load-detecting part; a comparing step for comparing the detected load value with the reference value to output an output signal by the driving part; and a solvent-sending step for carrying out either one of supply or discharge of the solvent by the valve actuated based on the output signal.

Preferably, the injection machine has a pump for sending the solvent disposed midway on a pipeline of the pipe, the pump functioning by cooperating with the valve driven by the driving part to support either one of supply or discharge of the solvent. In this case, in the solvent-sending step, either one of supply or discharge of the solvent is preferably supported by the pump actuated based on the output signal.

Preferably, the injection machine further comprises: a second through-hole disposed on a side surface of the heating barrel; a second pipe in which a solvent for adjusting a viscosity of the resin material is conducted, the second pipe being connected to the second through-hole; a second filter disposed in the second through-hole to prevent the resin material from leaking to the second pipe; a second valve disposed midway on a pipeline of the second pipe; and a second reservoir disposed on an end of the pipeline of the second pipe. In this case, the driving part preferably compares the detected load value with the reference value to drive the second valve to carry out the other of supply or discharge of the solvent, and in the solvent-sending step, both supply and discharge of the solvent are separately carried out.

More preferably, the injection machine has a second pump for sending the solvent disposed midway on a pipeline of the second pipe, the second pump functioning by cooperating with the second valve driven by the driving part to support the other of supply or discharge of the solvent. In this case, in the solvent-sending step, the other of supply or discharge of the solvent is preferably carried out by the second pump actuated based on the output signal.

Preferably, in the reference-value-setting step, a plurality of different reference values are set according to the kinds of powder material, binder, resin material, and solvent.

Preferably, in the reference-value-setting step, a plurality of different values are set according to molding conditions.

Preferably, in the solvent-sending step, the valve is driven over a predetermined period to carry out either one of supply or discharge of a predetermined amount of solvent.

Preferably, the method further comprises a stopping step for generating a stop signal such that either one of a supply operation or a discharge operation of the solvent is carried out in a more stable manner.

BRIEF DESCRIPTION OF THE DRAWINGS

FIG. 1 shows a first embodiment of the present invention;

DETAILED DESCRIPTION OF A PREFERRED EMBODIMENT OF THE INVENTION

Figure 2:
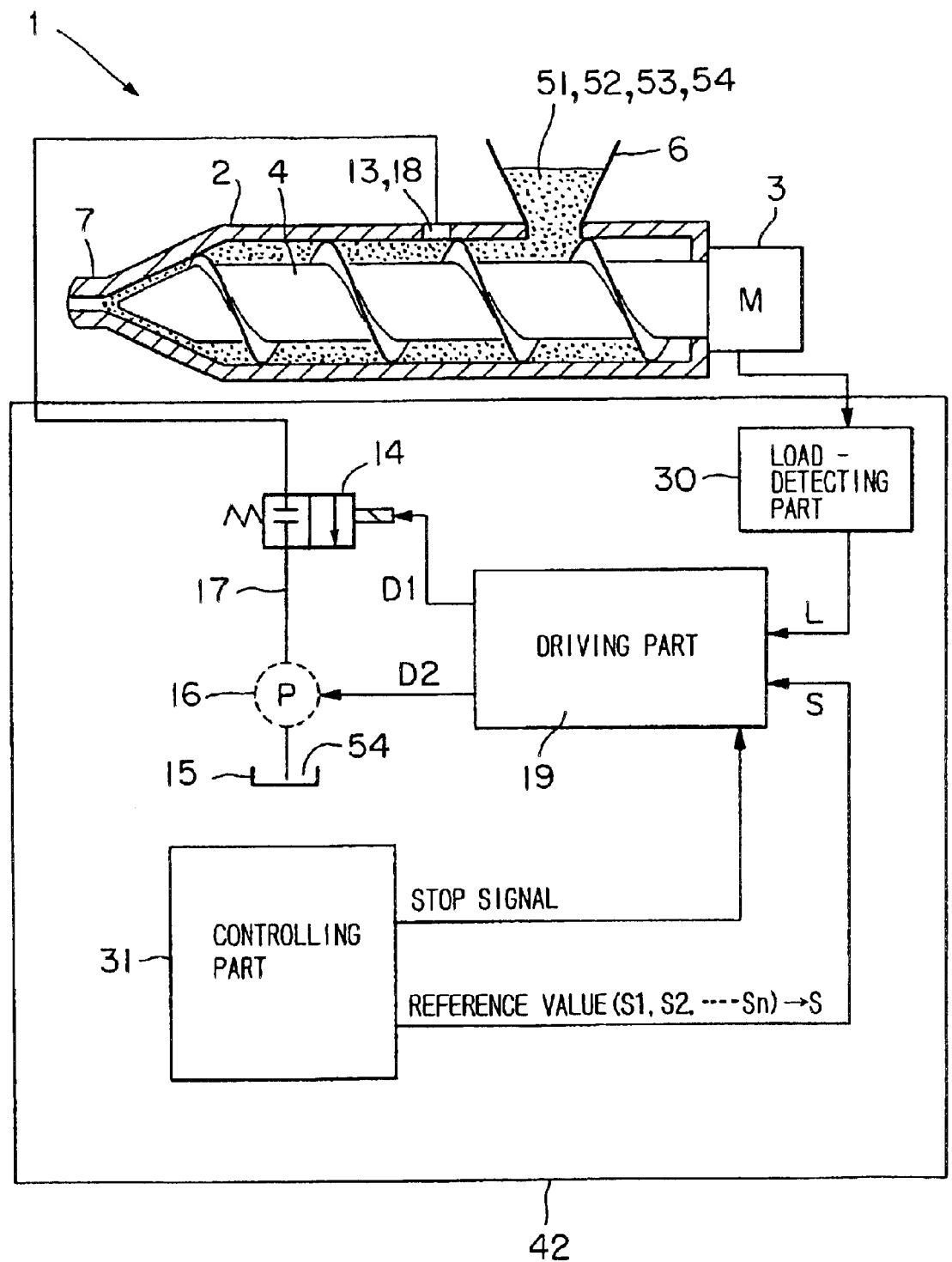
FIG. 2 shows a second embodiment of the present invention.

An embodiment of the present invention is hereinafter described with reference to FIG. 1.

A first embodiment of the present invention is described referring to FIG. 1. FIG. 1 shows a schematic view of an injection machine according to the embodiment. An injection machine 1 has a screw 4 for measuring which is rotated by a motor 3, the screw 4 being disposed in a bore of a heating barrel 2. A hopper 6 is attached at a rear end of the heating barrel 2, which supplies a powder material 51 such as metal or ceramic, a resin material 53, and a binder 52 for binding the powder material 51 and the resin material 53. The resin material 53 is melted by a heat from a heater (not shown) provided on an outer surface of the heating barrel 2 and a shear heat caused by a rotation of the screw 4, and measured forward the screw (leftward in the drawing). When the screw 4 is further advanced (leftward in the drawing), the measured molten resin is injected into a die (not shown) through a nozzle 7 at a tip of the heating barrel 2.

When the resin injected into the die pervades the die cavity, a molded product with a good appearance is provided. To this end, the viscosity of the molten resin including powder material 51, binder 52, and resin material 53 is adjusted. A solvent 54 is used therefor. Examples of the solvent 54 are water, ethanol, benzene, toluene, and so on. The solvent 54 is in a liquid or gas state, according to temperature. A hole 8 for supplying the solvent 54 is disposed on a side surface of the heating barrel 2, and passes into an inside of the heating barrel 2. A filter 18 is disposed in the hole 8 to prevent a leakage of powder material 51, binder 52, and resin material 53 from the heating barrel 2.

Next, a solvent-sending apparatus 41 is described. The solvent-sending apparatus 41 includes a valve 9, a reservoir 10, a pump 11, a pipe 12, a driving part 19, a load-detecting part 30, and a controlling part 31. The driving part 19, the load-detecting part 30, and the controlling part 31 are incorporated in a control disk (not shown) mounted on the injection machine 1. Electric wires from the driving part 19 are electrically connected to each connecting terminal of the valve 9 and the pump 11, so as to drive the valve 9 and the pump 11. An electric wire from the load-detecting part 30 is electrically connected to a connection terminal of the motor 3, so as to detect a load of the motor 3. The pipe 12 for conducting the solvent 54 from the reservoir 10 is fitted in the hole 8. The valve 9 is disposed midway on a pipeline of the pipe 12. With opening or closing of the valve 9, the solvent 54 is supplied or stopped, whereby the viscosity of the molten resin is adjusted.

When a pressure in the reservoir 10 sealed from the atmosphere is sufficiently higher than a pressure in the heating barrel 2, the solvent is supplied into the heating barrel 2 by opening the valve 9. When compensating a pressure difference, or using a reservoir open to the atmosphere, the pump 11 disposed midway on the pipeline is driven.

Next, a method of adjusting a viscosity is described in which the valve 9 and the pump 11 are controlled by the controlling part 31 and driven by the driving part 19. A reference value S is set by the controlling part 31 and is inputted to the driving part 19. The reference values S1, S2, . . . Sn shown by the controlling part 31 respectively show reference values with respect to a load of the motor 3, and the values are previously set according to the kind of powder material 51, binder 52, resin material 53, and solvent 54 used. One of the reference values S1, S2, . . . Sn is selected as a reference value S and inputted to the driving part 19. The driving part 19 compares a value L of a load of the motor 3 detected by the load-detecting part 30 with a reference value S of the motor 3 previously set by the controlling part 31. When the value L is larger than the value S, it may be judged that the viscosity of the molten resin in the heating barrel 2 is high and that the amount of solvent is insufficient. In this case, signals D1 and D2 for driving the valve 9 and the pump 11 are outputted by the driving part 19 so as to actuate the valve 9 and the pump 11. Thus, the valve 9 is opened, and the pump 11 is driven in rotation, so that the solvent is supplied from the reservoir 10 into the heating barrel 2.

A method may be adopted in which the driving signals D1 and D2 are outputted only over a duration when the value L is larger than the value S. However, in order to control the process more securely, a method that supplies respectively a predetermined amount (i. e., one shot) of a solvent is preferable. That is, when the value L is larger than the value S, the driving signals D1 and D2 are preferably outputted over only a predetermined period. In this case, a circuit (not shown) for generating a one-shot signal is provided to output the driving signals D1 and D2 by one shot. When the value L is still larger than the value S after elapsing the predetermined period, the driving signals D1 and D2 are additionally outputted by one shot. This is repeated until the value L is equal to or smaller than the value S. Thus, the viscosity of the molten resin is adjusted.

In order to make more accurate the supply of the solvent 54, a stop signal is generated by the controlling part 31. The driving signals D1 and D2 outputted by the driving part 19 are controlled by means of the stop signal as described below.

A period for comparing a load of the motor 3 with a reference value is provided. The driving signals D1 and D2 are made to be off to stop the supply of the solvent 54 during other than the comparing period. That is, in order to make the supply operation more stable, a stop signal is sent from the controlling part 31 to the driving part 19 to block the driving signals D1 and D2 so as not to open the valve 9, even when the load value L of the motor 3 is larger than the reference value S. With the repetition of the above operations, the molten resin is adjusted to have a desired viscosity.

A second embodiment of the present invention is described with reference to FIG. 2. While in the first embodiment, the method of adjusting the viscosity of the molten resin by supplying the solvent 54 is described, in the second embodiment shown in FIG. 2, the solvent 54 is previously mixed in the powder material 51, the binder 52, and the resin material 53, and the viscosity of the molten resin is adjusted by discharging the solvent 54 through a hole 13. When a pressure in the heating barrel 2 is sufficiently different from a pressure in a reservoir 15, the solvent 54 may be discharged into the reservoir 15 by opening a valve 14. In order to discharge the solvent more efficiently, a pump 16 may be disposed midway on a pipeline, the pump 16 being rotated in a discharge direction (opposite to a supply direction).

When a load value L of the motor 3 is judged to be smaller than a reference value S by the driving part 19, it may be judged that the viscosity of the molten resin in the heating barrel 2 is low, and that the solvent 54 is too much. Then, signals D1 and D2, for driving the valve 14 and the pump 16 which are disposed midway on a pipe 17, are outputted by the driving part 19 to actuate the valve 14 and the pump 16. Thus, the valve 14 is opened, and the pump 16 is driven, so that the solvent 54 is discharged from the heating barrel 2 back into the reservoir 15. Similar to the first embodiment, the driving part 19 is preferably controlled by using a stop signal.

Figure 3:
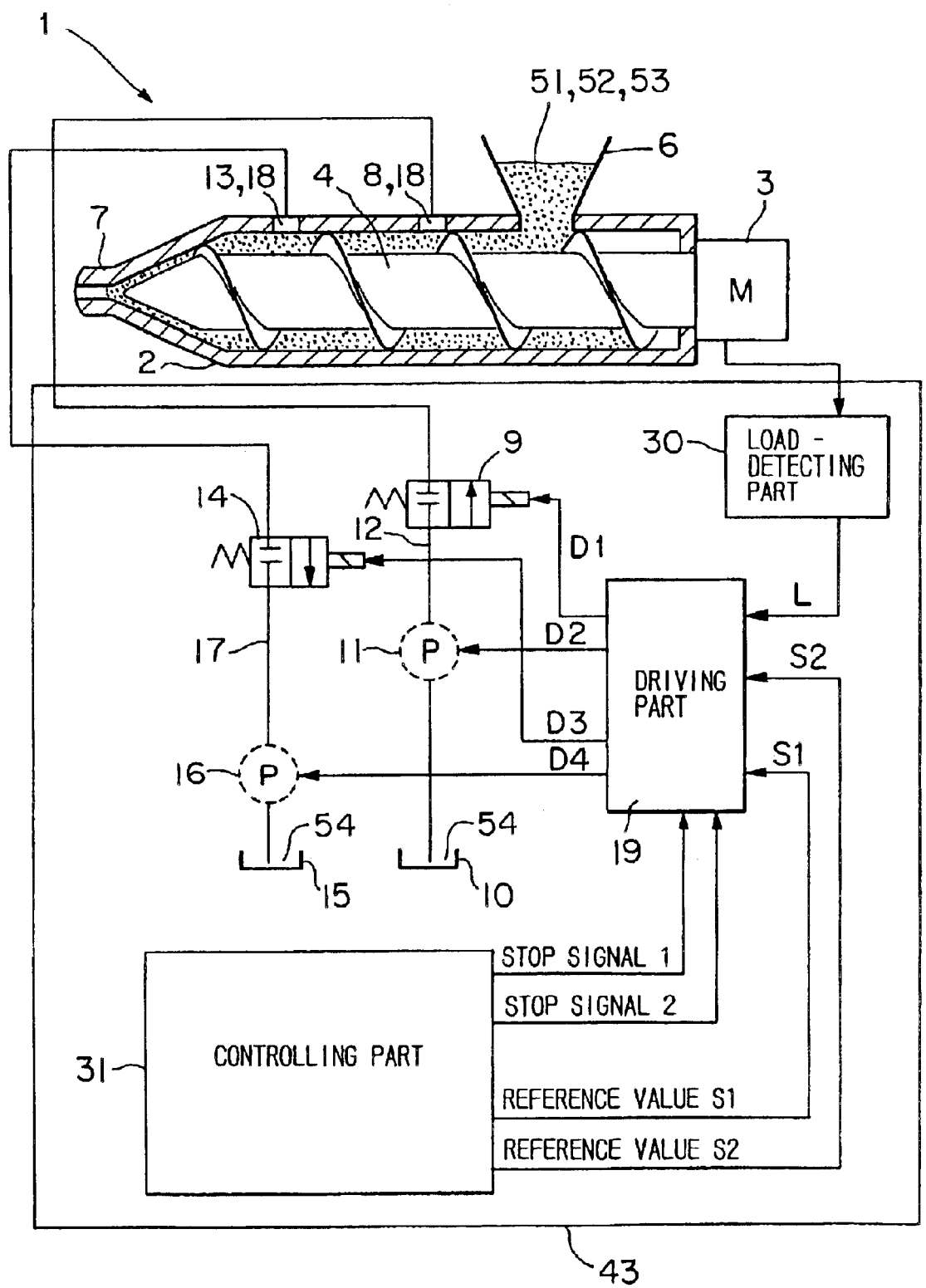
FIG. 3 shows a third embodiment of the present invention.

A third embodiment of the present invention is described with reference to FIG. 3. The third embodiment has both a supply method of the solvent 54 of the first embodiment shown in FIG. 1, and a discharge method of the solvent 54 of the second embodiment shown in FIG. 2, and is capable of immediately responding when either one is selected.

An embodiment of a method according to the present invention is hereinafter described.

An adjusting period is provided between the start of mixing and the finish of a viscosity adjustment. During other than the adjusting period, a supply operation is blocked so as not to supply a solvent even when conditions for supplying the solvent are satisfied, which are described below. This prevents a supply operation responding to a slight load change after a viscosity adjustment is once finished, and prevents an excess supply caused by a delay of a responding time of the supply operation. That is, since there is a predetermined adjusting period for supplying the solvent by one shot, a more stable control is achieved. Because the block operation, the supply operation by one shot, and the adjusting period are all controlled by a stop signal, the step is referred to as a stopping step.

In the stopping step, a stop signal is checked. When the stop signal is off, it means there is an adjusting period. Then, a load value L of a motor is detected in a next load-detecting step. In a reference-value-setting step, a reference value S to be compared with the load value of the motor is set. In a comparing step, the load value L and the reference value S are compared with each other. When the value L is larger than the value S, a valve is actuated in a solvent-sending step to supply a solvent into a heating barrel. The stop signal is made to be on while the solvent is supplied, so that a one-shot supply thereof is achieved. With the repetition of these steps, a molten resin is adjusted to have a desired viscosity.

In order to supply and/or discharge a solvent more efficiently, a pump for sending the solvent may be disposed midway on a pipeline. In this case, in the solvent-sending step, by the controlling part, the pump is driven in rotation in a direction of supply or discharge of the solvent, and the valve is opened.

In order to have both methods of supply or discharge of a solvent, and to immediately respond when either one is selected, another system including a hole, a pipe, a filter, a valve, and a reservoir may be separately disposed, and a supply and discharge of a solvent may be carried out by the respective systems in a solvent-sending step.

In order to more accurately adjust a viscosity according to the kind of powder material, binder, resin material, and solvent, as well as molding conditions, it is preferable that, in the reference-value-setting step, a plurality of different reference values are set, and a suitable one is selected to be utilized.

In the solvent-sending step, the valve is operated over a predetermined period so as to supply or discharge a predetermined amount of solvent.

In the stopping step, driving signals D1 and D2 are blocked to stop supply or discharge of a solvent, such that a supply operation and a discharge operation of the solvent are carried out in a more stable manner.

In the above description, although the hole is disposed on the top of the heating barrel, the hole may be located on any position of the heating barrel. Further, if needed, a plurality of holes may be present to mix the solvent more uniformly in the molten resin, or to discharge the solvent more efficiently. From the same reason, one or more long slit-shaped holes may be provided along the screw.

What is claimed is:

1. An injection machine comprising:
    a heating barrel which heats a powder material, a binder, and a resin material into a molten resin;
    a screw mounted in the heating barrel to mix the resin material;
    a motor which drives the screw in rotation;
    a through-hole disposed on a side surface of the heating barrel;

a pipe in which a solvent for adjusting a viscosity of the resin material is conducted, the pipe being connected to the through-hole;

a filter disposed in the through-hole to prevent the resin material from leaking to the pipe;

a valve disposed midway on a pipeline of the pipe;

a reservoir disposed on an end of the pipeline of the pipe;

a load-detecting part which detects a load value of the motor;

a controlling part which sets a reference value with respect to a load of the motor; and a driving part which compares the detected load value with the reference value to drive the valve to carry out either one of supply or discharge of the solvent.

2. An injection machine according to claim 1, wherein a pump for sending the solvent is disposed midway on the pipeline of the pipe, the pump functioning by cooperating with the valve driven by the driving part to support either one of supply or discharge of the solvent.

3. An injection machine according to claim 1, further comprising:

a second through-hole disposed on a side surface of the heating barrel;

a second pipe in which a solvent for adjusting a viscosity of the resin material is conducted, the second pipe being connected to the second through-hole;

a second filter disposed in the second through-hole, which prevents the resin material from leaking to the second pipe;

a second valve disposed midway on a pipeline of the second pipe; and a second reservoir disposed on an end of the pipeline of the second pipe; wherein the driving part compares the detected load value with the reference value to drive the second valve to carry out the other of supply or discharge of the solvent.

4. An injection machine according to claim 3, wherein a second pump for sending the solvent is disposed midway on the pipeline of the second pipe, the second pump functioning by cooperating with the second valve driven by the driving part to support the other of supply or discharge of the solvent.

5. An injection machine according to claim 1, wherein the controlling part sets a plurality of different reference values according to the kinds of powder material, binder, resin material, and solvent.

6. An injection machine according to claim 1, wherein the controlling part sets a plurality of different values according to molding conditions.

7. An injection machine according to claim 1, wherein the driving part drives the valve over a predetermined period to carry out either one of supply or discharge of a predetermined amount of the solvent.

8. An injection machine according to claim 1, wherein the controlling part generates a stop signal such that either one of supply operation or discharge operation of the solvent is carried out in a more stable manner.

9. A method of adjusting a viscosity of molten resin by an injection machine, the injection machine comprising:

a heating barrel which heats a powder material, a binder, and a resin material to provide a molten resin;

a screw mounted in the heating barrel to mix the resin material;

a motor which drives the screw in rotation;

a through-hole disposed on a side surface of the heating barrel;

a pipe in which a solvent for adjusting a viscosity of the resin material is conducted, the pipe being connected to the through-hole;

a filter disposed in the through-hole to prevent the resin material from leaking to the pipe;

a valve disposed midway on a pipeline of the pipe;

a reservoir disposed on an end of the pipeline of the pipe;

a load-detecting part which detects a load value of the motor;

a controlling part which sets a reference value with respect to a load of the motor; and a driving part which compares the detected load value with the reference value to drive the valve to carry out either one of supply or discharge of the solvent; the method comprising the steps of:

a reference-value-setting step for setting the reference value by the controlling part;

a detecting step for detecting a load value of the motor by the load-detecting part;

a comparing step for comparing the detected load value with the reference value to output an output signal by the driving part; and a solvent-sending step for carrying out either one of supply or discharge of the solvent by the valve actuated based on the output signal.

10. A method according to claim 9, wherein the injection machine has a pump for sending the solvent disposed midway on a pipeline of the pipe, the pump functioning by cooperating with the valve driven by the driving part to support either one of supply or discharge of the solvent, and wherein in the solvent-sending step, either one of supply or discharge of the solvent is supported by the pump actuated based on the output signal.

11. A method according to claim 9, wherein the injection machine further comprises:

a second through-hole disposed on a side surface of the heating barrel;

a second pipe in which a solvent for adjusting a viscosity of the resin material is conducted, the second pipe being connected to the second through-hole;

a second filter disposed in the second through-hole to prevent the resin material from leaking to the second pipe;

a second valve disposed midway on a pipeline of the second pipe; and a second reservoir disposed on an end of the pipeline of the second pipe; wherein the driving part compares the detected load value with the reference value to drive the second valve to carry out the other of supply or discharge of the solvent, and wherein in the solvent-sending step, both supply and discharge of the solvent are separately carried out.

12. A method according to claim 11, wherein the injection machine has a second pump for sending the solvent disposed midway on a pipeline of the second pipe, the second pump functioning by cooperating with the second valve driven by the driving part to support the other of supply or discharge of the solvent, and wherein in the solvent-sending step, the other of supply or discharge of the solvent is carried out by the second pump actuated based on the output signal.

13. A method according to claim 9, wherein in the reference-value-setting step, a plurality of different reference values are set according to the kinds of powder material, binder, resin material, and solvent.

14. A method according to claim 9, wherein in the reference-value-setting step, a plurality of different values are set according to molding conditions.

15. A method according to claim 9, wherein in the solvent-sending step, the valve is driven over a predetermined period to carry out either one of supply or discharge of a predetermined amount of solvent.

16. A method according to claim 9, further comprising:

a stopping step for generating a stop signal such that either one of a supply operation or a discharge operation of the solvent is carried out in a more stable manner.

* * * * *